United States Patent
Wang et al.

(10) Patent No.: US 9,047,109 B1
(45) Date of Patent: Jun. 2, 2015

(54) POLICY ENFORCEMENT IN VIRTUALIZED ENVIRONMENT

(75) Inventors: Song Wang, Palo Alto, CA (US); Martin Walter, Mountain View, CA (US); Zhipu Jin, Milpitas, CA (US); Wilson Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 259 days.

(21) Appl. No.: 13/528,748

(22) Filed: Jun. 20, 2012

(51) Int. Cl.
G06F 9/455 (2006.01)
G06F 9/46 (2006.01)

(52) U.S. Cl.
CPC .................................. G06F 9/45533 (2013.01)

(58) Field of Classification Search
None
See application file for complete search history.

(56) References Cited

U.S. PATENT DOCUMENTS

| | | | |
|---|---|---|---|
| 5,968,176 A | 10/1999 | Nessett et al. | |
| 6,453,419 B1 | 9/2002 | Flint et al. | |
| 6,484,261 B1 | 11/2002 | Wiegel | |
| 6,785,728 B1 | 8/2004 | Schneider et al. | |
| 6,826,698 B1 | 11/2004 | Minkin et al. | |
| 7,016,980 B1 | 3/2006 | Mayer et al. | |
| 7,194,529 B2 | 3/2007 | Kupiec et al. | |
| 7,900,005 B2 | 3/2011 | Kotsovinos et al. | |
| 8,185,573 B2 | 5/2012 | Izdepski et al. | |
| 8,224,918 B2 | 7/2012 | McCarthy et al. | |
| 8,341,732 B2* | 12/2012 | Croft et al. | 726/21 |
| 8,364,852 B1 | 1/2013 | Shukla et al. | |
| 8,385,519 B2 | 2/2013 | Lindblad et al. | |
| 8,413,147 B2 | 4/2013 | Shen et al. | |
| 8,495,721 B1 | 7/2013 | Moody et al. | |
| 8,566,900 B1 | 10/2013 | Bharali et al. | |
| 8,775,625 B2 | 7/2014 | Narayanaswamy et al. | |
| 2003/0097589 A1 | 5/2003 | Syvanne | |
| 2003/0149781 A1 | 8/2003 | Yared et al. | |
| 2005/0198283 A1 | 9/2005 | Ramamoorthy et al. | |
| 2007/0005801 A1 | 1/2007 | Kumar et al. | |
| 2008/0172366 A1 | 7/2008 | Hannel et al. | |
| 2009/0138938 A1 | 5/2009 | Harrison et al. | |
| 2009/0249438 A1 | 10/2009 | Litvin et al. | |
| 2009/0249472 A1* | 10/2009 | Litvin et al. | 726/14 |
| 2010/0107215 A1 | 4/2010 | Bechtel et al. | |
| 2010/0287548 A1 | 11/2010 | Zhou et al. | |
| 2012/0030751 A1* | 2/2012 | Datta et al. | 726/15 |
| 2012/0173757 A1* | 7/2012 | Sanden | 709/238 |
| 2012/0174186 A1* | 7/2012 | Aziz et al. | 726/1 |
| 2012/0311568 A1 | 12/2012 | Jansen | |
| 2012/0311575 A1* | 12/2012 | Song | 718/1 |
| 2012/0317610 A1* | 12/2012 | Kashyap | 726/1 |
| 2013/0019277 A1 | 1/2013 | Chang et al. | |
| 2013/0031544 A1* | 1/2013 | Sridharan et al. | 718/1 |
| 2013/0198808 A1* | 8/2013 | Thomson et al. | 726/4 |

* cited by examiner

Primary Examiner — Kenneth Tang
(74) Attorney, Agent, or Firm — Van Pelt, Yi & James LLP

(57) ABSTRACT

Policy enforcement in an environment that includes virtualized systems is disclosed. Virtual machine information associated with a first virtual machine instance executing on a host machine is received. The information can be received from a variety of sources, including an agent, a log server, and a management infrastructure associated with the host machine. A policy is applied based at least in part on the received virtual machine information.

16 Claims, 7 Drawing Sheets

```
        ┌ VM instance: vm-248
        │     name: DepartmentB1
        │     uuid: 42205b1b-0459-1bd5-b70e-ba57c45b9328                    ╭─208
202 ┤    │     guestFullName: Microsoft Windows Server 2008 R2 (64-bit)
        │     guestId: windows7Server64Guest
        │     host: Host1 ─╮ ╭─214         ╭─210                    ╭─212
        │     guest.net:
        │         ipAddress: 172.16.0.4, fe80::250:56ff:fea0:7cc3
        └     network: Engineering ┌ VM instance: vm-246
        │     name: DepartmentA1
        │     uuid: 4220f3c6-55fd-7490-d853-17026e111b19
204 ┤    │     guestFullName: Ubuntu Linux (64-bit)
        │     guestId: ubuntu64Guest
        │     host: Host2
        │     guest.net:
        │         ipAddress: 10.5.125.26, fe80::250:56ff:fea0:7cc1
        └     network: Sales ┌ VM instance: vm-247
        │     name: DepartmentA2
        │     uuid: 4220d782-e086-618a-4206-627ae562aa95
206 ┤    │     guestFullName: Other 2.6.x Linux (64-bit)
        │     guestId: other26xLinux64Guest
        │     host: Host2
        │     guest.net:
        │         ipAddress: 10.5.125.27, fe80::250:56ff:fea0:7cc2
        └     network: Engineering
```

FIG. 2

POLICY ENFORCEMENT IN VIRTUALIZED ENVIRONMENT

BACKGROUND OF THE INVENTION

Increasingly, businesses and other entities are using virtualized computing resources (whether running on purchased or leased computer hardware). Virtualized environments are generally very dynamic—virtual machines can easily be spun up, shut down, and moved. A given physical machine may support tens or hundreds of virtual machines and if that machine fails, the images running on the physical machine can be rapidly migrated to one or multiple other physical machines. Unfortunately, virtualized environments can pose problems for firewall rules which tend to rely on static information, such as static IP addresses.

BRIEF DESCRIPTION OF THE DRAWINGS

Various embodiments of the invention are disclosed in the following detailed description and the accompanying drawings.

FIG. 2 illustrates an example of virtual machine information used in some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
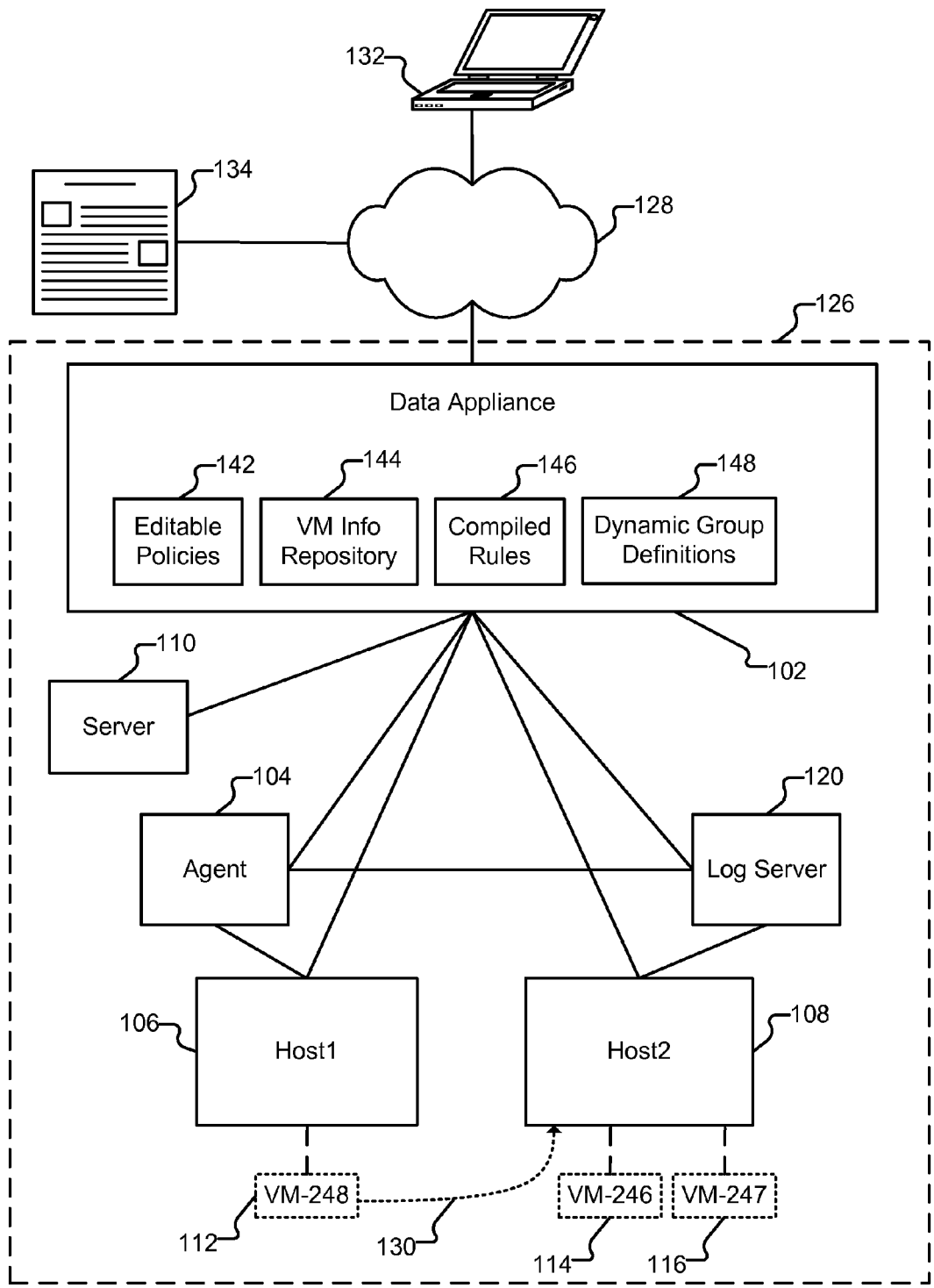
FIG. 1 illustrates an embodiment of an environment that includes virtualized computing resources.

FIG. 1 illustrates an embodiment of an environment that includes virtualized computing resources. As will be described in more detail below, policies can be enforced against those virtualized computing resources using the techniques described herein. In the example shown, enterprise network 126 includes various physical computing resources (e.g., server 110). Enterprise network 126 also includes three virtual servers (112-116), also referred to as "virtual machines," running on a total of two hosts (106 and 108).

Communications between virtual servers 112-116 and resources outside of enterprise network 126 (e.g., communications received from laptop 132 via network 128) pass through data appliance 102, which is placed at the perimeter of enterprise network 126. Such communications may take place using any appropriate communication protocol such as Hypertext Transfer Protocol (HTTP), Secure Sockets Layer (SSL), and File Transfer Protocol (FTP). In the example shown in FIG. 1, data appliance 102 is a firewall and is configured to enforce policies (also referred to herein as "rules") with respect to the communications it receives. Other types of devices can also be configured to provide the functionality described herein as being performed by data appliance 102. Examples include routers, gateways, intrusion detection systems, intrusion prevention systems, and other appropriate devices.

Other network topologies can also be used in conjunction with the techniques described herein. Examples of such topologies include networks having multiple data appliances; networks where at least some of the network nodes are located at a hosting company's data center; and networks in which data appliance 102 is configured to enforce policies with respect to traffic that stays within enterprise network 126 instead of or in addition to outside traffic.

As explained above, data appliance 102 is configured to enforce various policies. Such policies can apply to particular devices (e.g., virtual server 112), particular users, and/or groups (e.g., of devices or users). As one example, a policy can specify that access to virtual server 112 via HTTPS is permitted by anyone (including an arbitrary member of the public using laptop 132). As another example, a policy can specify that access to virtual server 116 via SSH is permitted by members of the Engineering group, and denied to anyone else. As yet another example, a policy can specify that virtual machines that are running the Ubuntu Linux operating system are allowed to communicate with known-malicious website 134 (e.g., because they are hardened research images), but no other nodes in network 126 are allowed to do so. Other types of actions can also be specified, such as policies requiring that certain types of access be logged. Other types of policies can also be specified, as applicable, such as quality of service policies, instead of or in addition to access/security policies.

Also included in the environment shown in FIG. 1 are agent 104 and log server 120, both of which are configured to collect virtual machine information (hereinafter "VM information") from hosts, such as host 106, and to provide the information to data appliance 102. The virtual machine information can be collected in a variety of ways. For example, agent 104 can us an application programming interface (API) provided by the host operating system on host 106 to collect information about the virtual machines running on it (e.g., virtual machine 112). As another example, suppose host 108 lacks such an API. Host 108 can be configured to log information (including information pertaining to its virtual machines 114 and 116) to a log server 120. Log server 120 can be configured to provide the information to agent 104, which in turn provides the information to data appliance 102, or log server 120 can provide the information directly to data appliance 102 directly, as applicable. As will be described in more detail below, the collected VM information can be used by data appliance 102 to enforce policies.

As shown in FIG. 1, agent 104 is physically separate from data appliance 102. The functionality of agent 104 can also be incorporated into data appliance 102 (or another device) and standalone agent 104 (and/or log server 120) omitted as applicable.

FIG. 2 illustrates an example of virtual machine information used in some embodiments. Depicted in FIG. 2 are three sets of records 202-206—corresponding to each of virtual machines 112-116, respectively. The records shown are examples of information that can be obtained from VMware vCenter. Similar records can be obtained from other virtualization platforms, such as XenServer, and the techniques described herein adapted as applicable. Further, as needed, the information collected by log server 120 can be translated, converted, or otherwise manipulated so that the VM information it obtains is provided to data appliance 102 in an appropriate format.

Included in a given record, such as record 202, is various information pertaining to the virtual machine instance, such as the operating system (208), IPv4/IPv6 addresses (210, 212), and an identifier of the host (214). As will be described in more detail below, the information included in the records can be used by data appliance 102 to enforce policies.

Figure 3:
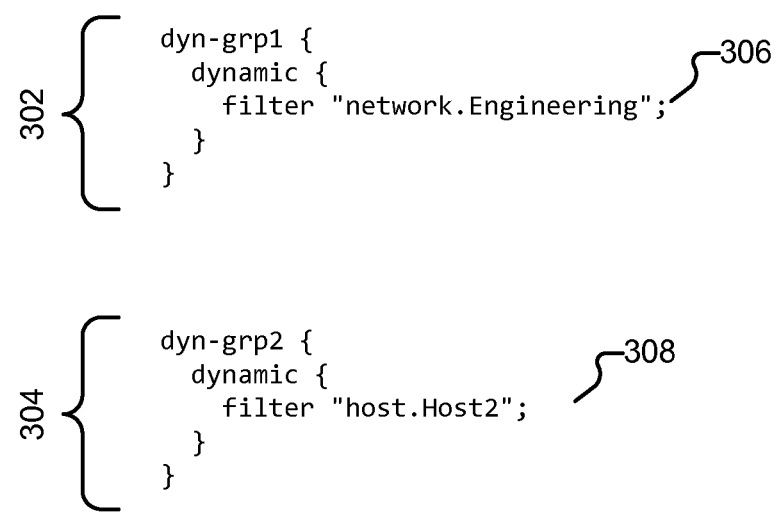
FIG. 3 illustrates two examples of dynamic group definitions.

The records can also be used to create dynamic groups (represented as "dynamic address objects"). Two examples of dynamic group definitions are depicted in FIG. 3. The first dynamic group (302) will include any virtual machine images on the portion of the enterprise network assigned to the Engineering department (306). The network (specifically, network=Engineering) is used as a filter. The second dynamic group (304) will include any virtual machine images running on host machine 108 (308). Multiple filters can also be combined, and Boolean or other operators can be employed to form more complex dynamic groups, such as a group that includes those virtual machines running a specific version of Windows 7 that are also either (a) running on host 106, and/or (b) are in the Sales network. Dynamic group definitions are configurable (e.g., by an administrator) and stored (148) in some embodiments on data appliance 102. In various embodiments, records, such as record 202, are augmented through the use of tags. For example, an administrator can specify a tag of "Windows" that is applicable to any version of a Windows-based operating system (e.g., Windows 95 and Windows 7). Such user-defined tags or other attributes can also be used as filters.

Figure 4A:
FIG. 4A illustrates an example of a policy.

FIG. 4A illustrates an example of a policy. Policy 402 states that any virtual machine in the Engineering dynamic group is permitted to access any destination using SSH. Policy 402 is stored (142) on data appliance 102 and is editable by an administrator (e.g., of data appliance 102). The administrator does not need to provide the IP addresses or range of addresses of all of the Engineering computers when creating (or editing) the rule shown in FIG. 4A, but rather can use the abstracted dynamic address object "dyn-grp1."

Policies, such as policy 402, are compiled (146) and, at runtime, used in enforcement by data appliance 102. Specifically, during compilation, the dynamic address object ("dyn-grp1") will be replaced with the IP address of each virtual machine matching that group's definition, based on the information stored in VM information repository 144. As will be described in more detail below, when the IP address of a particular virtual machine changes (or when any other change implicating a rule is made), the VM information for the virtual machine in repository 144 will be updated, and any applicable firewall rules updated as well.

Figure 4B:
FIG. 4B illustrates a conceptualized set of compiled rules.

FIG. 4B illustrates a conceptualized set of compiled rules. In the example shown, policy 402 has been compiled, resulting in two rules—one for each of the virtual machines in the dynamic group, dyn-grp1. Specifically, the current IP addresses of virtual machines 112 (404) and 116 (406) are present.

Figure 4C:
FIG. 4C illustrates a conceptualized set of compiled rules.

Suppose virtual machine 112, which is shown in FIG. 1 as being hosted by host 106, is migrated to host 108 as indicated by line 130. One reason for the migration is if host 106 has a hardware or other failure. The IP address of virtual machine 112 changes as a result of the migration (i.e., from 172.16.0.4 to 10.5.125.34). FIG. 4C shows policy 402 as recompiled after virtual machine 112 is migrated. Specifically, IP address 404 has been changed (408) to reflect the current IP address of virtual machine 112 after migration.

Figure 5:
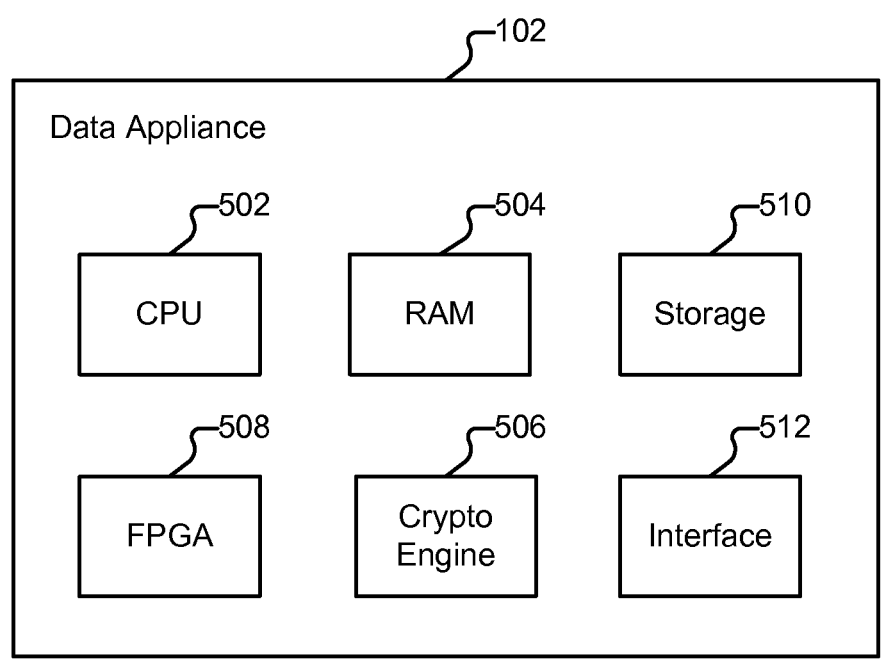
FIG. 5 illustrates an embodiment of a data appliance.

FIG. 5 illustrates an embodiment of a data appliance. The example shown is a representation of physical components that can be included in data appliance 102. Specifically, data appliance 102 includes a high performance multi-core CPU 502 and RAM 504. Data appliance 102 also includes a storage 510 (such as one or more hard disks), which is used to store policy and other configuration information. Data appliance 102 can also include one or more optional hardware accelerators. For example, data appliance 102 can include a cryptographic engine 506 configured to perform encryption and decryption operations, and one or more FPGAs 508 configured to perform signature matching, act as network processors, and/or perform other tasks. Also included in data appliance 102 is interface 512. In some embodiments, interface 512 exposes an application programming interface (API) via which devices, such as agent 104 and log server 120, keep data appliance 102 apprised of current VM information.

Figure 6:
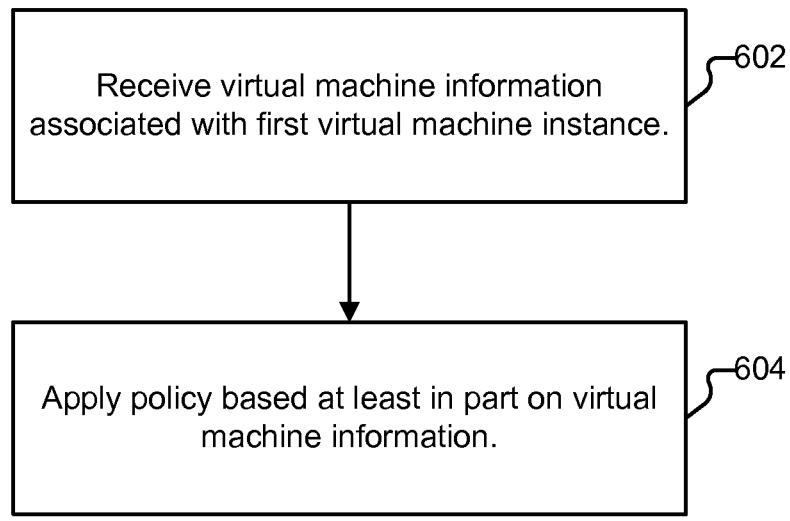
FIG. 6 illustrates an example of a process for enforcing a policy.

FIG. 6 illustrates an example of a process for enforcing a policy. In some embodiments the process shown in FIG. 6 is performed by data appliance 102. The process begins at 602 when virtual machine information associated with a first virtual machine instance is received. As previously explained, VM information can be received in a variety of ways, from a variety of sources. As one example, VM information (including information pertaining to virtual machine 112) is received at 602 when agent 104 receives VM info from host 106 via an API. As another example, VM info is received at 602 when log server 120 provides information to data appliance 102 (or provides the information to agent 104 which in turn provides it to data appliance 102) pertaining to virtual machine 116 and/or virtual machine 114. The received information is stored in VM information repository 144.

As previously explained, the received VM info is used to compile rules (146) enforceable by data appliance 102. At 604, such rules (corresponding to policies) are enforced. As one example, at 604, policy 402 is enforced with respect to virtual machine 112, whose IP address (assuming the machine has not yet migrated) is included in compiled rule 404. As another example, if an image is cloned, policies can automatically be enforced against the new image based on any matches of attributes of that image's VM information with filters. Rules can be recompiled, as needed.

Figure 7:
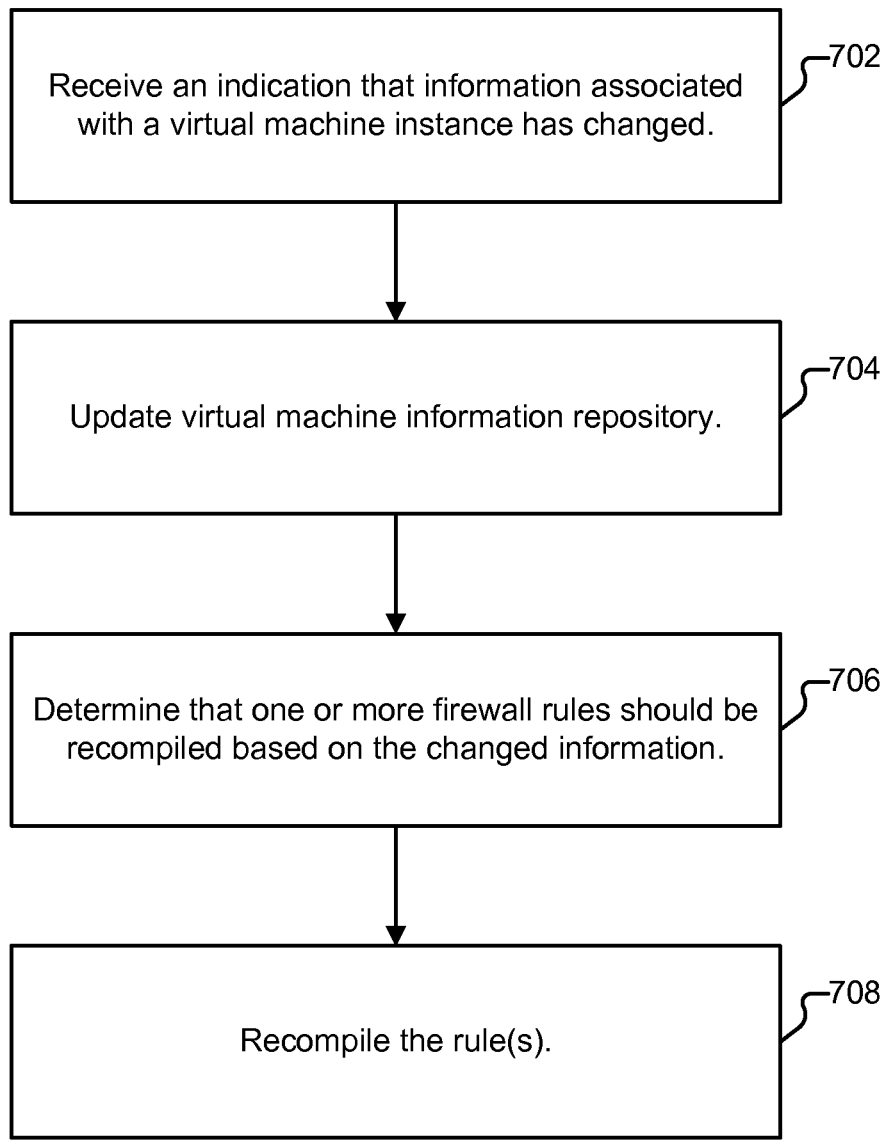
FIG. 7 illustrates an example of a process for updating a rule.

FIG. 7 illustrates an example of a process for updating a rule. In some embodiments the process shown in FIG. 7 is performed by data appliance 102. The process begins at 702 when an indication that information associated with a virtual machine instance has changed is received. The indication can be received in a variety of ways. As one example, when virtual machine 112 is migrated from host 106 to host 108, agent 104 may receive a push notification from host 106 regarding the migration event. Agent 104 then contacts host 108 (or log server 120, as applicable) to retrieve updated VM information for virtual machine 112 and provide it to data appliance 102 as an update (704). In some embodiments, when agent 104 receives the push notification from host 106, agent 104 instructs data appliance 102 to remove entry 202 from VM information repository 144. In that scenario, when the virtual machine image is brought up on host 108, host 108 (or log server 120, as applicable) notifies agent 104 (or data appliance 102, as applicable) of the presence of virtual machine 112 and a new record is created in VM information repository 144 as appropriate.

Indications of changes in VM information can also be received in other ways. For example, agent 104 can be configured to periodically pull information from sources such as log server 120, perform a diff or other comparison, and provide updates to data appliance 102.

At 706, a determination is made as to whether any firewall rules need to be recompiled based on the changed information. As one example, when virtual machine 112 migrates from host 106 to host 108, rule 404 will need to be recompiled (as rule 408) so that policy 402 continues to be satisfied. As another example, other attributes of a virtual machine might change, but, if such attributes are not used as filters (e.g., in any dynamic address objects), there will be no need to recompile any rules.

Finally, at 708, any implicated rules are recompiled.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a rule to be applied to network traffic associated with members of a specific dynamic address group, wherein membership of a computing resource in the specific dynamic address group is determined at least in part by performing a query using a set of one or more filters;
      receive virtual machine information associated with a first virtual machine instance executing on a host machine;
      determine, based at least in part on matching a portion of the received virtual machine information with the set of one or more filters, that the first virtual machine instance is a member of the dynamic address group; and
      in response to the determination, apply the rule to network traffic associated with the first virtual machine instance; and
   a memory coupled to the processor and configured to provide the processor with instructions.

2. The system of claim 1 wherein the virtual machine information is received from an agent.

3. The system of claim 1 wherein the virtual machine information is received from a log server.

4. The system of claim 1 wherein the virtual machine information is received from a management infrastructure associated with the host machine.

5. The system of claim 1 wherein the virtual machine information is received indirectly from the host machine.

6. The system of claim 1 wherein the processor is further configured to compile the rule at least in part by substituting a dynamic group address object with an IP address of the first virtual machine instance.

7. The system of claim 1 wherein the filter comprises an attribute included in the virtual machine information.

8. The system of claim 1 wherein the processor is further configured to determine whether the rule should be recompiled, at least in part based on a change to membership in the specific dynamic address group.

9. The system of claim 1 wherein the processor is further configured to receive updated virtual machine information and determine that a change associated with the first virtual machine instance has occurred.

10. The system of claim 9 wherein the host machine is a first machine and wherein the updated information indicates that the first virtual machine instance has migrated from executing on the first host machine to executing on a second host machine.

11. The system of claim 9 wherein the updated information indicates that an IP address of the first virtual machine instance has changed.

12. A method, comprising:
   receiving a rule to be applied to members of a specific dynamic address object group, wherein membership of a computing resource in the specific dynamic address group is determined at least in part by performing a query using a set of one or more filters;
   receiving virtual machine information associated with a first virtual machine instance executing on a host machine;
   determining, based at least in part on matching a portion of the received virtual machine information with the set of one or more filters, that the first virtual machine instance is a member of the dynamic address group; and
   in response to the determination, applying the rule to network traffic associated with the first virtual machine instance.

13. The method of claim 12 further comprising determining whether a rule associated with the first virtual machine instance should be recompiled, at least in part based on a change to membership in the specific dynamic address group.

14. The method of claim 12 further comprising receiving updated virtual machine information and determining that a change associated with the first virtual machine instance has occurred.

15. The method of claim 14 wherein the host machine is a first machine and wherein the updated information indicates that the first virtual machine instance has migrated from executing on the first host machine to executing on a second host machine.

16. A computer program product embodied in a non-transitory tangible computer readable storage medium and comprising computer instructions for:
   receiving a rule to be applied to members of a specific dynamic address object group, wherein membership of a computing resource in the specific dynamic address group is determined at least in part by performing a query using a set of one or more filters;
   receiving virtual machine information associated with a first virtual machine instance executing on a host machine;
   determining, based at least in part on matching a portion of the received virtual machine information with the set of one or more filters, that the first virtual machine instance is a member of the dynamic address group; and in response to the determination, applying the rule to network traffic associated with the first virtual machine instance.

* * * * *